(12) United States Patent
Delorenzis

(10) Patent No.: US 7,641,181 B2
(45) Date of Patent: Jan. 5, 2010

(54) DISTRIBUTED POWER SUSPENSION SYSTEM

(75) Inventor: Damon Delorenzis, Long Beach, CA (US)

(73) Assignee: Liquid Spring Technologies, Inc., Sante Fe Springs, CA (US)

( * ) Notice: Subject to any disclaimer, the term of this patent is extended or adjusted under 35 U.S.C. 154(b) by 539 days.

(21) Appl. No.: 10/351,211

(22) Filed: Jan. 24, 2003

(65) Prior Publication Data

US 2004/0145100 A1 Jul. 29, 2004

(51) Int. Cl.
*F16F 9/10* (2006.01)
(52) U.S. Cl. .................... 267/64.13; 267/274
(58) Field of Classification Search .............. 280/5.508, 280/5.565; 268/64.13, 64.28, 64.19, 64.15, 268/64.16; 188/284, 314, 297, 298
See application file for complete search history.

(56) References Cited

U.S. PATENT DOCUMENTS

| | | | |
|---|---|---|---|
| 2,072,701 A | 3/1937 | Barlow | |
| 2,225,986 A | 12/1940 | Glezen | |
| 3,146,862 A | 9/1964 | Winsen | |
| 3,483,952 A | 12/1969 | Cardwell | |
| 3,604,725 A | 9/1971 | Goff et al. | |
| 3,618,928 A | 11/1971 | Taylor | |
| 3,625,540 A | 12/1971 | Jewell | |
| 3,734,478 A * | 5/1973 | Lohr | 267/34 |
| 3,933,344 A | 1/1976 | Taylor | |
| 3,963,261 A * | 6/1976 | Hiruma | 280/683 |
| 4,031,978 A | 6/1977 | Taylor | |
| 4,070,035 A * | 1/1978 | Pelouch | 280/6.158 |
| 4,079,923 A | 3/1978 | Kirchner | |
| 4,099,602 A | 7/1978 | Kourbetsos | |
| 4,182,529 A | 1/1980 | Taylor | |
| 4,200,269 A | 4/1980 | Ludwig | |
| 4,212,087 A | 7/1980 | Mortensen | |
| 4,305,486 A | 12/1981 | Cowan | |
| 4,361,346 A * | 11/1982 | Harris | 280/5.508 |
| 4,402,527 A | 9/1983 | Kakehi et al. | |
| 4,513,833 A | 4/1985 | Sheldon | |
| 4,546,960 A | 10/1985 | Abrams et al. | |
| 4,561,641 A | 12/1985 | De Young et al. | |
| 4,638,670 A | 1/1987 | Moser | |
| 4,638,895 A | 1/1987 | Taylor et al. | |
| 4,648,621 A | 3/1987 | Yokoya et al. | |
| 4,671,392 A | 6/1987 | Wössner | |
| 4,729,459 A | 3/1988 | Inagaki et al. | |
| 4,733,883 A | 3/1988 | Sugasawa et al. | |
| 4,741,516 A | 5/1988 | Davis | |

(Continued)

FOREIGN PATENT DOCUMENTS

DE 3608738 9/1987

(Continued)

*Primary Examiner*—Melanie Torres
(74) *Attorney, Agent, or Firm*—Christie, Parker & Hale, LLP.

(57) ABSTRACT

The present invention relates to a vibration control or vehicular suspension system. In one embodiment, the system uses a liquid spring filled with a compressible liquid. In such an embodiment, a suspension system, in addition to being able to change stiffness and damping properties, has the ability to level a vehicle or other structure or device to a desired height and compensate the level height for the addition or subtraction of load. Further, the liquid spring can provide either spring force or both spring and damping forces.

61 Claims, 6 Drawing Sheets

U.S. PATENT DOCUMENTS

| | | | |
|---|---|---|---|
| 4,793,451 A | 12/1988 | Taylor | |
| 4,826,205 A | 5/1989 | Kouda et al. | |
| 4,911,470 A * | 3/1990 | Fukunaga | 280/5.5 |
| 5,004,264 A | 4/1991 | Kozaki et al. | |
| 5,018,756 A | 5/1991 | Mitchell | |
| 5,062,659 A | 11/1991 | Edahiro et al. | |
| 5,097,419 A | 3/1992 | Lizell | |
| 5,152,547 A | 10/1992 | Davis | |
| 5,263,559 A * | 11/1993 | Mettner | 188/266.5 |
| 5,265,704 A | 11/1993 | Landesfeind | |
| 5,297,653 A | 3/1994 | Wurtz et al. | |
| 5,316,272 A | 5/1994 | Davis | |
| 5,443,283 A | 8/1995 | Hawkins et al. | |
| 5,533,586 A | 7/1996 | Thompson | |
| 5,678,846 A | 10/1997 | Davis | |
| 5,934,422 A | 8/1999 | Steed | |
| 5,941,508 A | 8/1999 | Murata et al. | |
| 5,988,607 A | 11/1999 | Beck | |
| 6,179,310 B1 * | 1/2001 | Clare et al. | 280/124.159 |
| 6,206,152 B1 | 3/2001 | Grundei et al. | |
| 6,214,999 B1 * | 4/2001 | Biard et al. | 548/250 |
| 6,293,530 B1 | 9/2001 | Delorenzis et al. | |
| 6,305,673 B1 | 10/2001 | Delorenzis et al. | |
| 6,494,442 B2 | 12/2002 | Beck et al. | |
| 2002/0000699 A1 * | 1/2002 | Ruddle | 280/5.5 |
| 2004/0094104 A1 * | 5/2004 | Cuadro | 123/90.12 |

FOREIGN PATENT DOCUMENTS

| | | |
|---|---|---|
| DK | 144808 | 6/1982 |
| FR | 933524 | 4/1948 |
| GB | 2192967 | 1/1988 |
| GB | 2227981 | 8/1990 |
| JP | 57-160707 | 10/1982 |
| JP | 60-179315 | 9/1985 |
| JP | 60-226311 | 11/1985 |

* cited by examiner

DISTRIBUTED POWER SUSPENSION SYSTEM

BACKGROUND OF THE INVENTION

The present invention relates generally to vibration control or vehicular suspension systems and, in a preferred embodiment thereof, more particularly provides for a liquid spring vehicular suspension system with an ability to level a vehicle to a desired height, an ability to compensate the level height for the addition or subtraction of load to the vehicle and/or an ability to manage temperature-related changes to fluid volume.

In the past, liquid springs have been used in vibration control or vehicular suspension systems in which the stiffness and damping characteristics of each liquid spring can be adjusted during operation in response to either a sensed variation in the liquid spring or the operating environment. The vibration isolation system could be a vibration control system to protect structures or sensitive machinery from an abusive environment. Alternatively, it could be a vehicular suspension, wherein the characteristics of each liquid spring can be adjusted in response to road conditions or driver inputs. See U.S. Pat. No. 6,305,673, which is incorporated herein by reference. Although the ability to change stiffness and damping is an important property of liquid spring technology, there is a need for additional features to make for a fully functional suspension system.

Among the additional features that can make a suspension system more functional are an ability to level a vehicle or other structure or device to a desired height and to compensate the level height for the addition or subtraction of load as well as other factors. There are liquid spring suspension systems which attempt to provide the desired leveling capabilities, but these systems rely on a central power supply.

The central power supply provides a source and sink of high pressure fluid for use by the system to accommodate the changes in fluid quantity required to accomplish the leveling function. The power supply might include, for example, a hydraulic pump, driven by an electric- or pneumatic-powered motor. The power supply in such a centralized configuration compresses fluid to the appropriate pressure and stores it in an accumulator so that it is readily available to use in any of the multiple struts of the suspension system. The accumulator is required because the actual demand on the power supply is unpredictable. At a given time, any one or more of the struts could require an amount of pressurized fluid. If the hydraulic pump of the power supply were sized to accommodate the requirements of all the struts together, it would be too big for the average demand. The accumulator, therefore, acts in a way to buffer the output of the hydraulic pump and average the peak demand.

The leveling control provides the actuation for leveling and the control of fluid quantity required to set a desired vehicle height at each wheel. This is typically accomplished by having at each wheel a pair of valves, one for leveling up (a fill valve which admits high pressure fluid from the accumulator) and one for leveling down (a dump valve which removes fluid to a low pressure reservoir). These valves act under the command of a signal from some type of controller. The leveling control acts in response to feedback from sensors indicating the current height. By opening a fill valve, the vehicle is raised, while by opening a dump valve, the vehicle is lowered.

A hydraulic harness is a system of tubes which provides a way to transmit the fluid power to and from each wheel. As this harness is required to hold fluid under the pressure of the accumulator charge, its tube components must be able to withstand high pressures. A typical system will have two separate tubes extending to each wheel from the central power supply.

In operation, the fill and dump valves at each wheel are actuated in response to signals from the controller to change the height of the suspension at that wheel. If a fill valve opens, fluid is removed from the accumulator. The motor is switched on by the pressure switch when enough fluid is drawn from the accumulator to reduce the pressure to a certain low pressure. The motor powers the hydraulic pump to charge the accumulator with more fluid, until the pressure switch senses a certain higher pressure, signaling the motor to turn off. This is a traditional architecture for a hydraulically-charged system where the power supply is centralized and runs independently of the load-bearing components, each of which draw power from the central power supply as needed.

There are, however, numerous disadvantages to central power supply systems. With a central power supply, the hydraulic pump must be larger than would be optimal for each individual component of demand, but may not be so large as to handle the rare peak demand. It must also be a high pressure pump, a more expensive form of pump that is more difficult to obtain. Further, a hydraulic harness is necessary. This makes the system difficult to assemble and makes retrofit on an existing vehicle particularly difficult. The extensive hydraulic harness also requires that the suspension system be hydraulically bled after assembly on the vehicle.

It would be desirable to provide a liquid spring vehicular suspension system which has needed leveling ability, but uses a more efficient power supply and/or eliminates the use of an accumulator. One or more embodiments of the present invention provide such a system.

SUMMARY OF THE INVENTION

The present invention relates to a vibration control or vehicular suspension system. In one embodiment, the system uses a liquid spring filled with a compressible liquid. In such an embodiment, a suspension system, in addition to being able to change stiffness and damping properties, has the ability to level a vehicle or other structure or device to a desired height and compensate the level height for the addition or subtraction of load.

The liquid spring can be either a passive or an active system. An active system uses a second volume of compressible fluid. A passive system uses only a single volume of compressible fluid. Further, the liquid spring can provide either spring force or both spring and damping forces. Alternatively, a single volume liquid spring can be utilized in conjunction with a conventional damper.

In one embodiment, in a suspension system having at least two struts, a leveling system separately comprises for each strut a power supply, a fluid reservoir wherein the fluid reservoir is connected to the strut by a fluid passage and the power supply serves to increase the pressure of fluid in the fluid passage. The embodiment may further comprise a valve coupled to the fluid passage, wherein the valve is selectively operable to place the fluid reservoir in communication with the strut to vary the fluid quantity in the strut.

In another exemplary embodiment, a leveling system in a suspension system comprising a motor, a pump, a check valve, a fluid reservoir and a strut wherein the fluid reservoir is connected to the strut by a fluid passage, and the motor operates the pump to increase the pressure of fluid in the fluid passage until it is greater than the fluid pressure in the strut, at which point the check valve opens to allow fluid to pass from the fluid passage into the strut.

In another embodiment, a vibration control system can minimize the transmission of vibration between a first mass and a second mass. In one such embodiment, the first mass is a vehicle frame and the second mass is a vehicle cabin. In another such embodiment, the vibration is controlled between a building or other structure or device and the ground.

DETAILED DESCRIPTION

Figure 1:
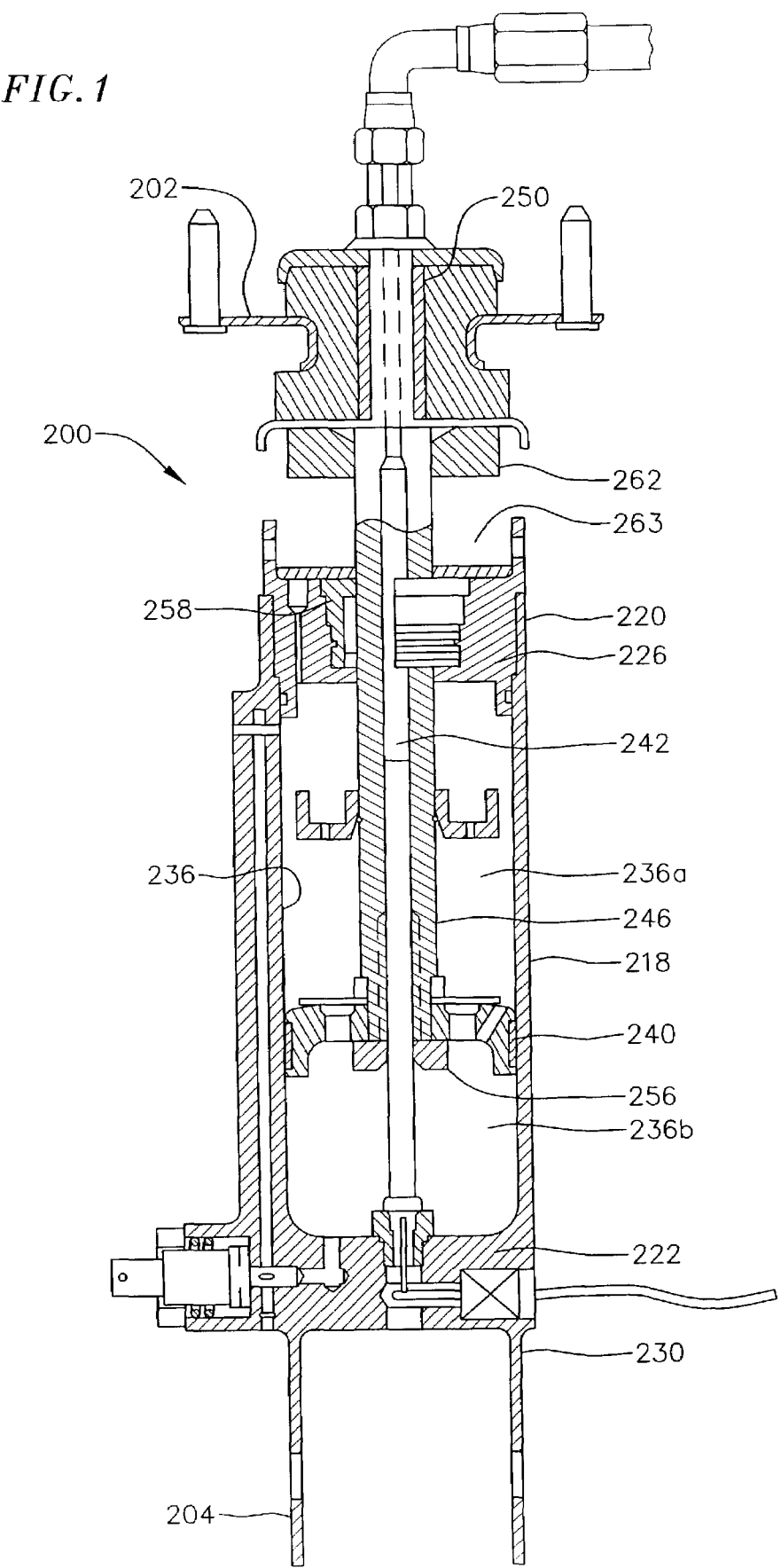
FIG. 1 is a schematic, partially cross-sectional illustration of an adjustable liquid spring device which can be used as part of the present invention.

Schematically illustrated in FIG. 1 is a cross-sectional illustration of an adjustable liquid spring device, indicated generally at 200, which can be used with the present invention. Liquid spring 200 comprises a generally vertically oriented, single rod end type liquid spring. The present invention also comprehends the use of a double rod end type liquid spring as described U.S. Pat. No. 5,316,272 which is incorporated herein by reference. U.S. Pat. No. 4,741,516 and U.S. Pat. No. 6,305,673 are also incorporated herein by reference.

The liquid spring 200 is connected by its upper end mounting bracket 202 to a vehicle frame, (not shown), and by its lower end mounting bracket 204 to the support structure (not shown) of its associated wheel, and operates to provide the requisite suspension system leveling functions and spring and damping forces at its associated wheel location. Such a spring can also be used for vibration control with a vehicle cab, compressor or other structures that vibrate during operation.

Liquid spring 200 includes an elongated, generally vertically oriented tubular housing 218 having an upper end 220 and a lower end 222. An upper annular gland member 226 is threaded into the upper housing end 220 and a lower annular gland member 230 is welded or threaded to the lower housing end 222.

The gland members 226 and 230 define within the housing 218 interior a chamber 236 which contains a compressible liquid. An annular piston 240 is vertically reciprocal within the chamber 236 and divides it into an upper "rebound" chamber 236a, and a lower "jounce" chamber 236b. An elongated hollow cylindrical rod structure 246 is coaxially secured to the annular piston 240 at a lower end and coaxially secured to upper mounting bracket 202 at an upper end. Rod structure 246 has a cylindrical interior chamber 242 extending from its upper end 250 to its lower end 256 and passing through the central opening in annular piston 240. Interior chamber 242 decreases the weight of the rod structure 246, and allows for the incorporation of an integral position sensor.

The rod structure 246 is slidably and sealingly carried within a suitable seal structure 258 in upper gland member 226 as known in the art. An upper end portion of rod structure 246 is extended upwardly through resilient jounce bumper 262 which abuts against bounce pad cavity 263 when rod structure 246 is fully extended into the chamber 236.

The structure described above is one example of a "strut" that may be used with the present invention. However, those skilled in the art will appreciate that the present invention will be compatible with a wide variety of struts which use fluid to level a vehicle, adjust its ride height and/or serve to control vibration. For example, the strut may be an "air" spring which uses air or another compressed gas, such as nitrogen, as the fluid component. The strut may also be an "Air over Oil" design which uses hydraulic oil as a working fluid in the strut and includes an additional gas spring accumulator to provide the required spring compliance.

Further, as later described, the liquid spring can be controlled using a computer which continuously and automatically adjusts key operational aspects of the spring in response to sensed variations in selected vehicle and liquid spring operating parameters.

With the vehicle at rest, the portion of the vehicle weight borne by the wheel structure associated with the liquid spring 200 exerts a downward axial force on the strut, in this embodiment rod structure 246, tending to force it further into the chamber 236. Downward movement of rod structure 246 in this manner progressively decreases the volume of the compressible liquid within the chamber 236 due to the increased space occupied by the progressively extending rod structure 246. This volume decrease, in turn, increases the pressure of the compressible fluid within the chamber 236, which exerts a progressively increasing net upward force on rod structure 246 and piston 240. This force tries to push the rod structure 246 back out of the chamber 236. When this net upwardly directed fluid pressure force on the rod structure 246 and piston 240 equals the portion of the vehicle weight borne by its associated wheel structure, the piston 240 will be at a vertical equilibrium point within the housing chamber 236—a point which, as a general proposition, establishes the "ride height" of the vehicle when it is at rest or travelling along essentially level terrain.

A source of high pressure fluid for use by the system to accommodate the changes in fluid quantity required to accomplish the leveling function is required. In certain embodiments of this invention, such as those shown in FIGS. 2 and 3, this source of high pressure fluid is provided for each strut by a distributed or self-contained power supply 10. By being "self-contained," the power supply 10 is specific to each strut and provides only enough fluid under pressure to satisfy the immediate demand of the associated strut 22. For example, the pressure needed to satisfy the immediate demand of a strut 22 may be about 3000 psi, i.e., just above the pressure of the fluid in the strut 22. In the case where there are two or more struts, one power supply 10 does not provide high pressure fluid to any other strut in the suspension system. The power supply 10 responds directly to leveling commands from the leveling control. The leveling control may be an electronic computer, such as a microprocessor or micro-controller or it may be an analog, mechanical or hydraulic computer, such as sets of electrical relays or hydraulic valves.

Figure 2:
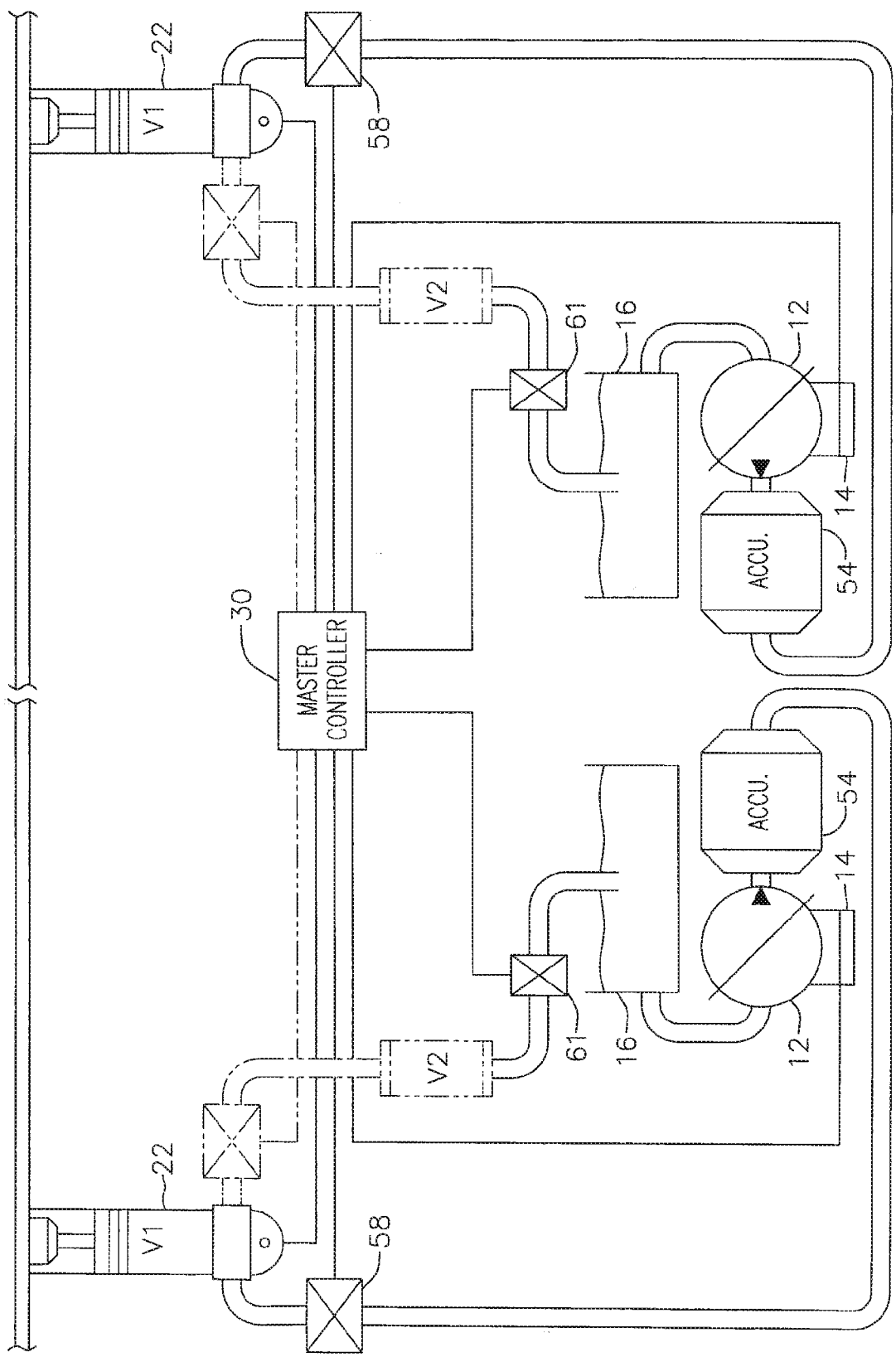
FIG. 2 is a schematic diagram of a liquid spring vehicular suspension system with an accumulator.

In one exemplary embodiment of the present invention, as shown in FIG. 2, the power supply may include a pump 12 driven by a motor 14 which compresses fluid from a reservoir 16 to the appropriate pressure and stores it in an accumulator 54 which holds pressurized fluid for only one strut. Since the accumulator holds fluid for only one strut, a hydraulic harness providing a way to transmit fluid power to and from each wheel is not necessary. Further, the accumulator may be a smaller size than if it held fluid for a plurality of struts. When more fluid is needed in the strut, a fill valve 58 is opened and admits high pressure fluid from the accumulator 54 to the strut 22. For example, the fluid pressure inside the accumulator may be about 5000 psi to allow for repeated adjustments without needing to run the pump. However, in this embodiment, such a pressure might then require use of a high pressure pump. When the fluid is no longer needed in the strut 22, a dump valve 61 opens to allow fluid to flow from the strut 22 back to the fluid reservoir 16. These actions may be controlled by a master controller 30.

Figure 3:
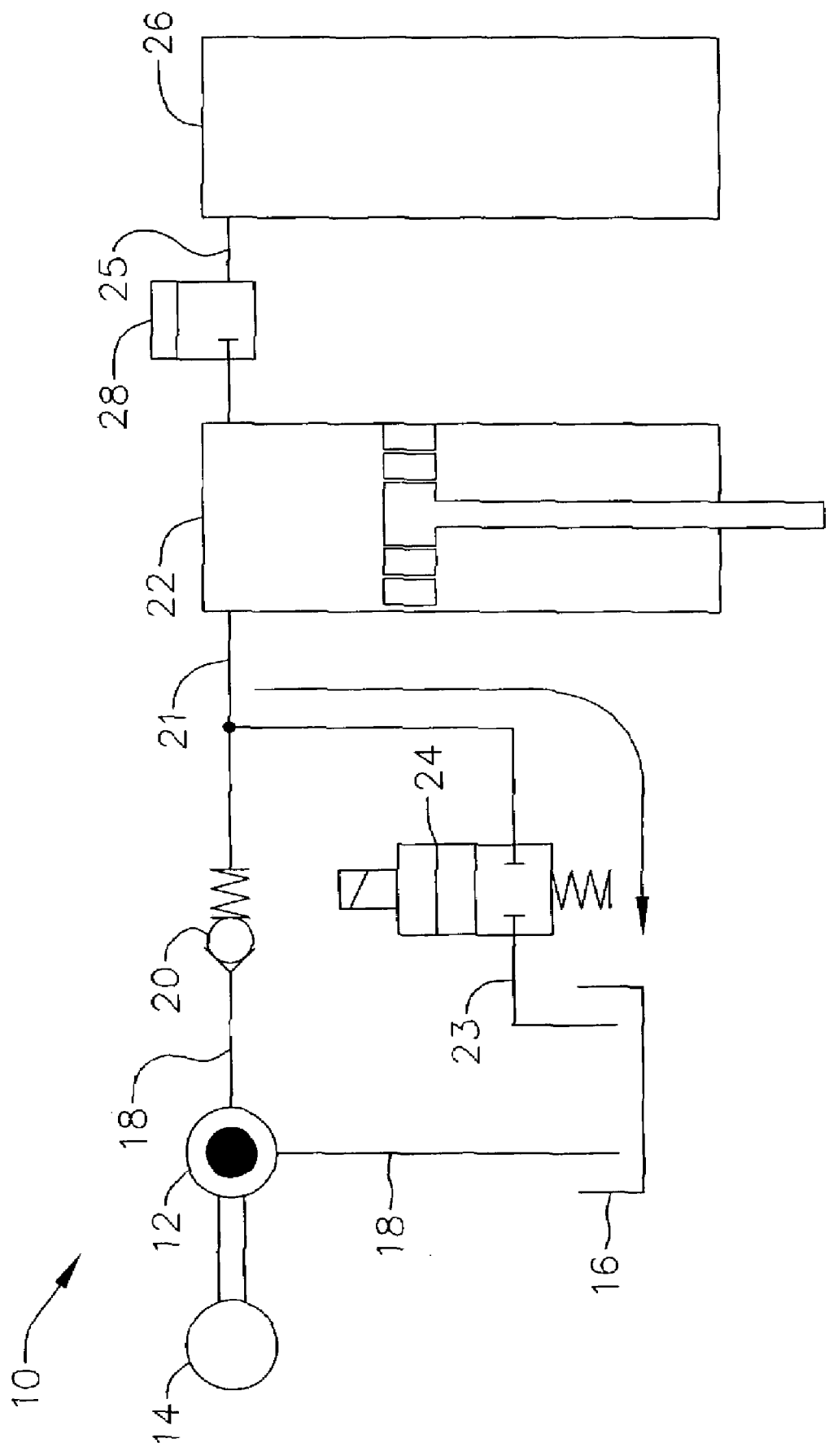
FIG. 3 is a schematic diagram of a liquid spring vehicular suspension system with a check valve and a secondary volume.

In another exemplary embodiment of the present invention, as shown in FIG. 3, no high pressure accumulator is needed and the power supply includes a hydraulic pump 12. The pump need only supply fluid at a pressure just above that in the strut. Thus, the hydraulic pump 12 may be any type of positive displacement pump, for example, a gear pump, a piston pump or a screw pump. Manufacturers of pumps applicable to the present invention include Oildyne, Fenner and Marzocchi, among others. In one embodiment, the pump may be driven by a motor 14 such as an electric motor or a pneumatic motor.

Figure 6:
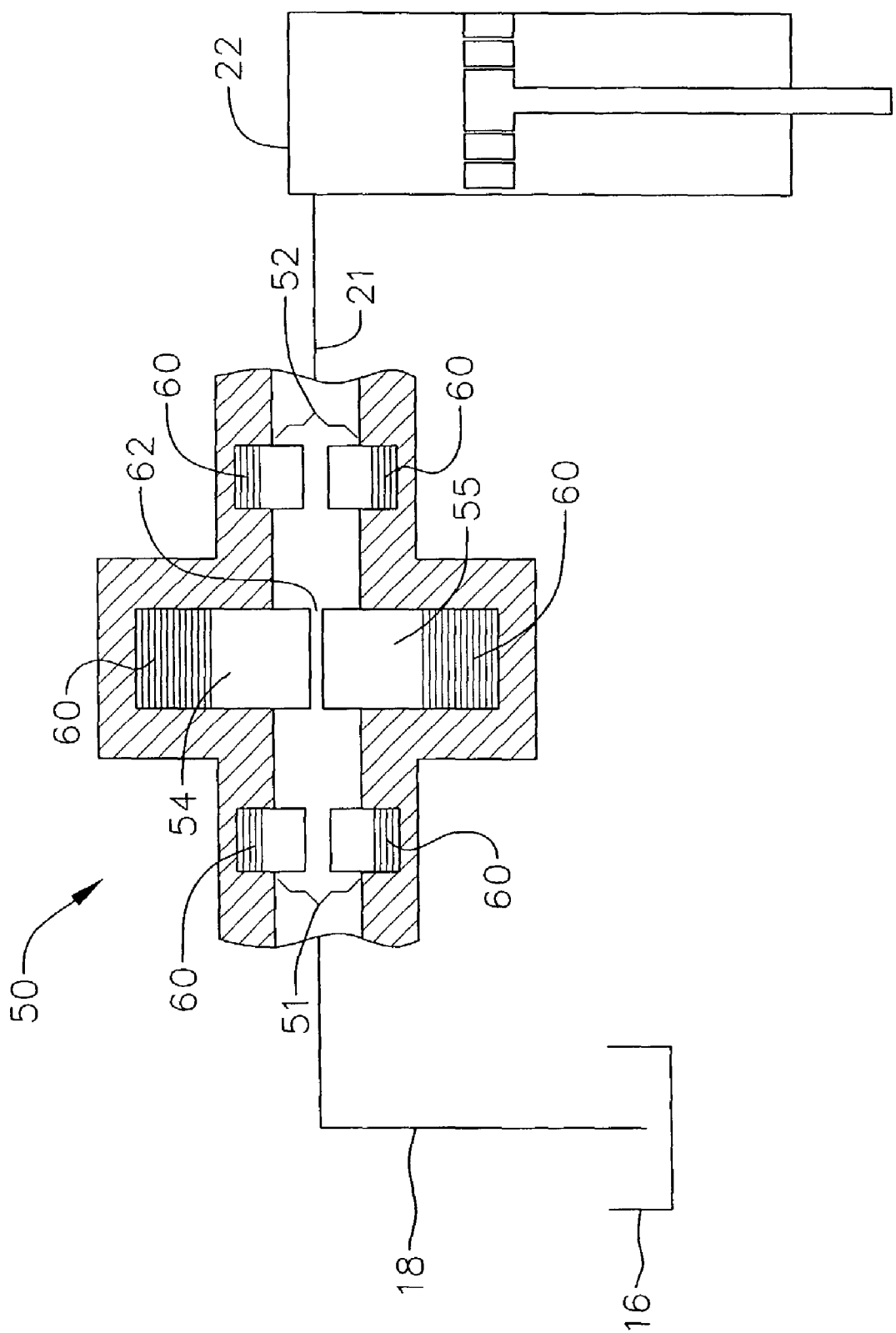
FIG. 6 is a schematic drawing of a liquid spring vehicular suspension system with a piezo-electric pump.

In another embodiment, as shown in FIG. 6, the function of the pump 12 may be combined with the motor 14 through the use of a membrane-type pump or, more specifically, a piezoelectric pump 50. A typical piezo-electric pump 50 may comprise an inlet valve 51, a pair of opposed pistons 54, 55 and an outlet valve 52. The valve and piston actuators may contain stacked piezoelectric or electroconstructive ceramic wafers 60. A phased voltage may be applied to the actuators to make them operate in a sequence to move a fluid from the inlet to the outlet. For example, the inlet valve 51 may be opened to allow some fluid to flow into the gap 62 between the separated pistons 54, 55. After closing the inlet valve 51, the outlet valve 52 may be opened and the pistons 54, 55 brought into contact with each other, thereby pushing some fluid through the open outlet valve 52 into the fluid passage 18. Pressure sensors (not shown) in the pistons and valves may provide feedback control.

In another embodiment, referring to FIG. 3, the pump 12 may also be connected to a fluid reservoir 16. The fluid reservoir 16 serves to collect and store excess fluid in the system. The fluid reservoir 16 may be at low pressure, for example, atmospheric pressure or slightly above atmospheric pressure, because the pump 12 serves to increase fluid pressure in the system when increased pressure is necessary. The fluid reservoir 16 may be connected to the hydraulic pump 12 by a fluid passage 18. The fluid passage 18 should allow fluid to travel from the fluid reservoir 16 through the hydraulic pump 12 and eventually, in one embodiment, to a check valve 20 or any appropriate device which permits the fluid to flow in one direction, but not in the opposite direction. For example, a membrane-type pump or other similar pumps may include a feature which inherently permits fluid to flow in one direction, but prevents it from flowing in the opposite direction. The check valve 20, or other similar device, should prevent the flow of hydraulic fluid from a second orifice back through to a first, for instance, if the output pressure becomes less than that of the connected distribution line, fluid passage 18. The check valve 20 may be of any appropriate type for preventing the back flow of hydraulic fluid. For example, Parker CV series or Deltrol DCV series check valves may be used.

The check valve 20 may be connected to the strut 22 by a second fluid passage 21 which allows for fluid to enter the strut 22. The addition of fluid into the strut may, for example, serve to compensate a vehicle for the addition of a static load or a change in the ride height.

Additionally, a dump valve 24 may be connected to the fluid passage 21 between the check valve 20 and the strut 22. There may also be a fluid passage 23 which connects the dump valve 24 to the fluid reservoir 16. The dump valve 24 allows fluid to drain from the strut 22 back to the fluid reservoir 16, therefore allowing the fluid quantity in the strut 22 to be decreased.

In another exemplary embodiment, see FIG. 3, a coupling 25 is provided which is in fluid communication with strut 22. Coupling 25 allows a secondary, external volume 26 of compressible fluid to be selectively placed in fluid communication with the compressible fluid in strut 22. There may be one secondary volume 26 which is in communication with all the struts or there may be a separate secondary volume 26 for each individual strut. A separate secondary volume 26 for each strut allows the suspension system to be more self-contained because there is less reliance on communication with a centralized aspect of the system. As described hereinbelow with reference to FIG. 3, this allows the strut 22 to exhibit two different spring rates, depending on whether or not the secondary volume is coupled to the strut 22 volume.

The spring rate of each strut 22 may be changed by opening or closing of rate/damp valve 28 to couple or uncouple the secondary volume 26 to the respective strut 22. Valve 28 may be operated by solenoid. For example, suppose that each strut 22 is constructed so that it has a chamber volume of 50 cubic inches and that secondary volume 26 contains 100 cubic inches of compressible fluid. If strut 22 is coupled in fluid communication with secondary volume 26 by opening of solenoid valve 28, strut 22 will have an effective volume of 150 cubic inches and the spring rate will almost instantaneously change. Because differing effective volumes translate to differing spring rates, the single secondary volume 26 allows great flexibility in the spring rate of strut 22.

The embodiment of FIG. 2 may also incorporate a second volume of fluid to allow for spring rate adjustment. This second volume V2 along with its associated valve is shown in phantom line in FIG. 2.

Figure 4:
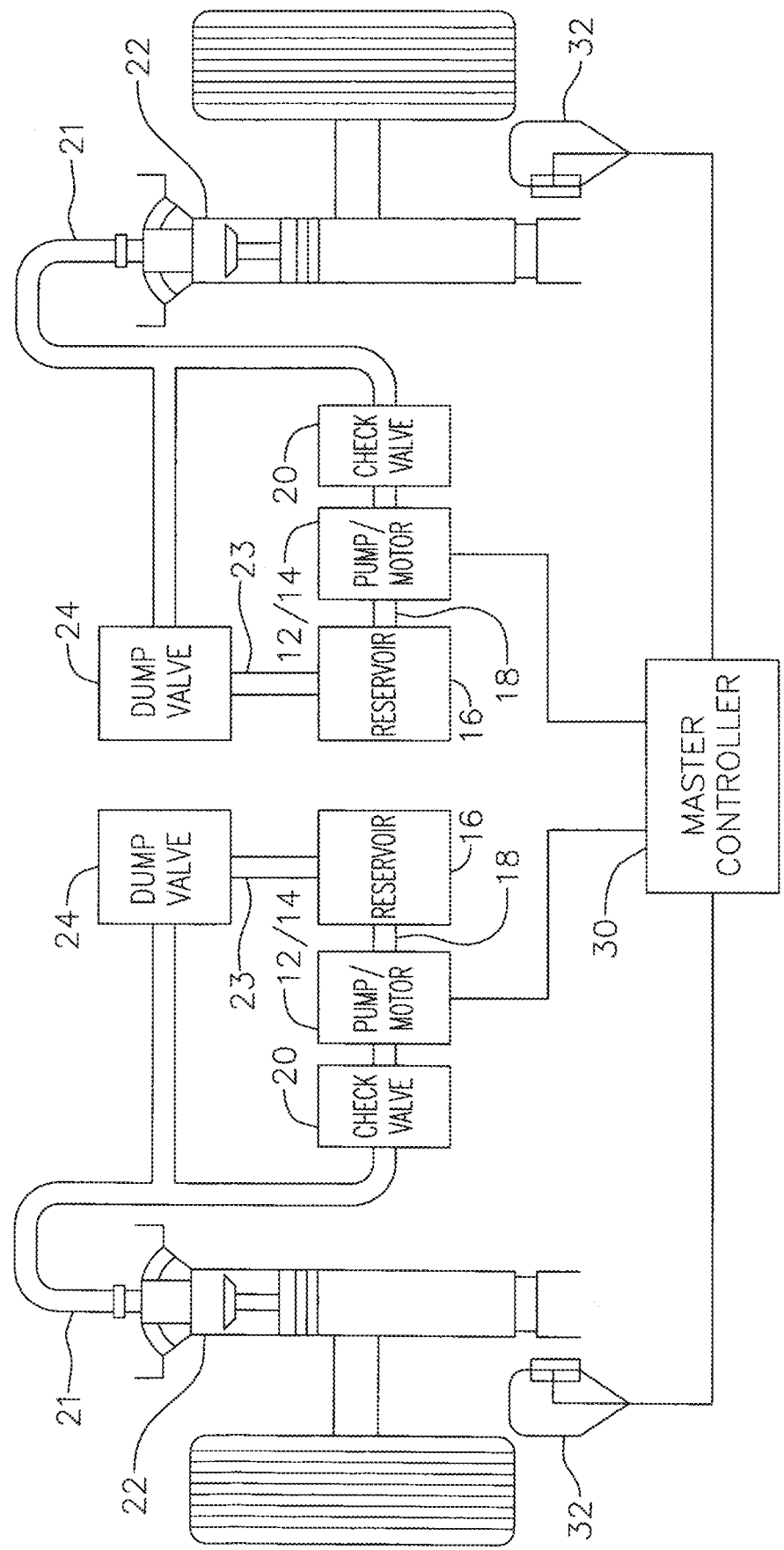
FIG. 4 is a schematic drawing of a liquid spring vehicular suspension system showing a master controller.

As shown schematically in FIG. 4, master controller 30 is preferably a digital microprocessor, but may also comprise an analog control system. Master controller 30 may receive input signals from a height sensor 32. Height sensor 32 is operable to generate an electrical signal representative of the relative displacement between the vehicle frame and the wheel support assembly, which corresponds to the relative displacement of rod structure 246 into chamber 236 (see FIG. 1). It is understood that there may be a plurality of height sensors which provide input to master controller 30 (see FIG. 2).

In order to level the vehicle, a height sensor 32 sends an individual signal to the master controller 30 indicating the height of the respective corners of the vehicle relative to the respective wheel support structures. In an exemplary embodiment, each height sensor has a null center position. The null center position corresponds to the desired position of the vehicle body. The height sensor 32 is therefore capable of communicating to the master controller 30 whether the vehicle body at the respective corner is above or below the null center position. A linear potentiometer, a linear variable differential transformer or an optical or magnetic proximity sensor, for example, may also be used to level the vehicle in this manner. In another embodiment, the master controller 30 will execute a three point leveling, wherein the two rear wheels are not leveled independently. In yet another embodiment, the master controller 30 will level the vehicle by control of each corner height using a body-modal leveling method. Modal leveling involves adjusting a vehicle body in each of its three modes of motion (pitch, roll and heave) in order to reach the desired position. Sensors that measure planar orientation for modal leveling include a mercury switch tilt-sensor or a multi-axial accelerometer.

If, for example, the height sensor 32 indicates that a corner of the vehicle is above the null center position, the master controller 30 will open solenoid dump valve 24, thereby releasing compressible fluid from strut 22 into reservoir 16. As a further example, when height sensor 32 indicates that the left front corner of the vehicle is at null center, the solenoid dump valve 24 is closed. However, if the height sensor 32 indicates that the left front corner of the vehicle is below null center position, the master controller 30 will turn on the motor 14. The motor will activate the pump 12 which will increase the pressure of the fluid in the fluid passage 18 until it is greater than the fluid pressure in the strut 22. The pressure increase will cause the check valve 20 to open and allow the fluid to flow from the fluid passage 21 to the strut 22, increasing the fluid quantity in the strut 22. The increase in fluid quantity will then increase the ride height of the vehicle to the desired level. Once the desired ride height is reached, the motor and pump will deactivate and the check valve will close, allowing the vehicle to remain at the desired height. If the height sensor 32 indicates that one corner of the vehicle is above null center position, the master controller will open the dump valve 24, thereby releasing fluid from the strut 22 into the fluid reservoir 16, and lowering the vehicle. An identical procedure may be used for each strut in the vehicle.

For example, the filling operation in a system with an accumulator and fill valve (FIG. 2) may take place as follows:
1. Sensor signals it is low;
2. Controller signals fill valve to open;
3. Fluid flows into the strut;
4. Accumulator supplies fluid for step 3 until the accumulator pressure starts to drop;
5. Dropping accumulator pressure signals the motor to turn on (either through the controller or by mechanical switch;
6. Pump runs, filling the accumulator and increasing accumulator pressure;
7. Meanwhile, the sensor signals it is at the correct height;
8. Controller signals fill valve to close;
9. Leveling done;
10. Increasing accumulator pressure signals motor to turn off;
11. Pump stops;
12. Pumping done.

By contrast, the filling operation in a system with a check valve (FIGS. 3 and 4) may take place as follows:
1. Sensor signals it is low;
2. Controller signals motor to turn on;
3. Pump increases pressure until the check valve opens;
4. Fluid flows into the strut;
5. Sensor signals it is at the correct height;
6. Controller signals the motor to turn off;
7. Pump stops;
8. Pressure in the line between the pump and the check valve drops until the check valve closes;
9. Leveling is done.

These examples point out that in the system including an accumulator, pumping and leveling are two separate and somewhat independent activities, while in the system with a check valve, pumping and leveling are combined.

With further reference to FIG. 4, if a load is added to the vehicle which causes the sensor to indicate that a certain strut is below null center, the master controller will turn on the motor 14. The motor will activate the pump 12 which will increase the pressure of the fluid in the fluid passage 18 until it is greater than the fluid pressure in the strut 22. The pressure increase will cause the check valve 20 to open and allow the fluid to flow from the fluid passage 18 to the strut 22, increasing the fluid quantity in the strut 22. The increase in fluid quantity will then increase the ride height of the vehicle to the desired level. Once the desired ride height is reached, the motor and pump will deactivate and the check valve will close, allowing the vehicle to remain at the desired height. If the height sensor 32 indicates that a corner of the vehicle is above null center position, the master controller will open the dump valve 24, thereby releasing fluid from the strut 22 into the fluid reservoir 16, and lowering the vehicle. An identical procedure may be used for each strut in the vehicle.

It is not feasible in a vehicle suspension environment to maintain the liquid spring compressible liquid at a constant temperature. Because the compressible liquid changes its liquid volume proportionally to temperature, changes in liquid temperature may be counteracted by adding or subtracting a quantity of compressible liquid. Requirements for adding or subtracting quantities of compressible liquid due to temperature changes may therefore be controlled with the reservoir 16, pump 12, motor 14 and check valve 20 system. Expansion or contraction of the compressible liquid due to changes in temperature result in vehicle ride height variations which are sensed by a ride height sensor 32. The master controller 30 opens or closes the check valve 20 or dump valve 24 in response to inputs from the height sensor 32, which maintains a desired quantity of fluid in the strut 22, thereby keeping the vehicle at the desired height.

Figure 5:
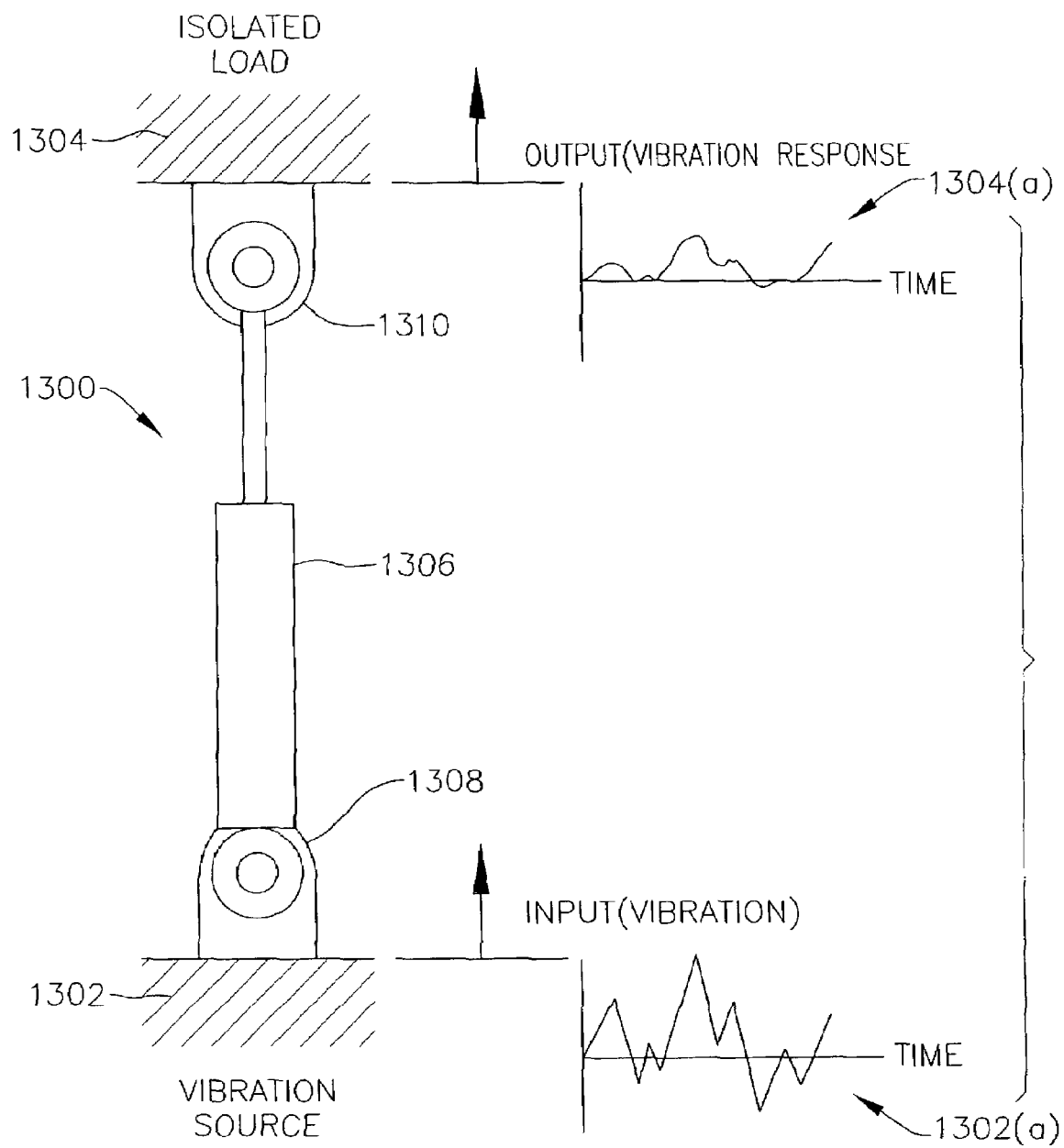
FIG. 5 is a schematic diagram of a liquid spring vibration control system for use in a building.

FIG. 5 illustrates a general strut 1300 for the present vibration control and leveling system. A liquid spring 1306 may be placed between a vibration source 1302 and a load 1304 to be isolated. The method can readily be applied to any suspension of load or a vibration isolation problem. The liquid spring system described above can provide a very wide range of spring rates, coupled with lower energy consumption and cost than active systems, and can benefit a variety of non-vehicle-suspension applications. The vibration source can be generally characterized by the graph 1302a which shows a variety of vibration amplitudes as a function of time. The liquid spring can dampen the impact of these vibrations as shown in graph 1304a. Note, the amplitude of the vibration is greatly diminished. This is accomplished by either 1) mechanical isolation of the load from the vibration source and/or 2) adaptation of the system spring rate according to the characteristics of the vibration input. The liquid spring can be attached between the vibration source and the isolated load by a variety of connections. Pinned connections 1308, 1310 are shown. Pinned connections allow for a certain amount of horizontal translation between the vibration source and the isolated load.

The use of a liquid spring can be a great benefit in a number of applications. For example, earthquakes destroy many types of structures such as buildings, bridges, elevated highways, and tunnels. In each of these examples, a liquid spring can be placed between a first structural member and a second structural member. An elevated highway, for instance, uses a pad (typically poured concrete) to support a column. A beam then spans between adjacent columns. During an earthquake, vibration creates a dynamic load which may overcome the structural integrity of the column or the beam. A liquid spring can be placed between the pad and the column. Alternatively, the liquid spring can be placed between the column and the beam. If the underlying soil is suitable, a liquid spring could conceivably be placed between ground and the pad. The liquid spring will minimize the transmission of the vibration between the various structural members. A passive system provides a certain level of protection. An active system could actually sense the vibration and determine the best spring rate and damping to reduce any risk of damage. It must be understood that such a system can be used with virtually any type structure. In a building, for example, the liquid spring could be placed between the building foundation and a structural member. Alternatively, the liquid spring could be placed between floors. In any piece of equipment or structure that may need leveling, such as those described above, the liquid spring may be placed between the equipment or structure and the ground and the suspension system may be used to level the equipment or structure. The liquid spring can be placed at any angle, vertically, or horizontally. The suspension system may be used, for instance, to level the floor of a building that has been subjected to a large addition of weight or settling of the ground beneath it.

Although preferred embodiments of the present invention have been described in the foregoing Detailed Description and illustrated in the accompanying drawings, it will be understood that the invention is not limited to the embodiments disclosed, but is capable of numerous rearrangements, modifications and substitutions of parts and elements without departing from the spirit of the invention. For example, the present invention may be designed for use with any number of separate external volumes, thereby allowing for more than two different spring rates to be applied to the liquid spring. Accordingly, the present invention is intended to encompass such rearrangements, modifications and substitutions of parts.

I claim:

1. In a suspension system having at least two struts, a leveling system separately comprising for each strut:
    a fluid reservoir, the fluid reservoir being connected to the strut by a fluid passage;
    a pump, the pump being controllable between an activated state to increase the pressure of fluid in the fluid passage and a nonactivated state; and
    a valve coupled to the fluid passage, the valve placing the fluid reservoir in communication with the strut to vary fluid quantity in the strut and control fluid flow from the fluid reservoir toward the strut in response to the pump being controlled to be in the activated state and the valve preventing the fluid reservoir from communicating with the strut in response to the pump being controlled to be in the nonactivated state;
    wherein the leveling system operates normally without a need for pressure regulation.

2. The suspension system of claim 1 wherein the pump is powered by a motor.

3. The suspension system of claim 1 wherein the pump is a hydraulic pump.

4. The suspension system of claim 3 wherein the pump is a positive displacement pump.

5. The suspension system of claim 2 wherein the motor is an electric motor.

6. The suspension system of claim 1 wherein the pump and the valve comprise a membrane-type pump.

7. The suspension system of claim 1 wherein the pump and the valve comprise a piezo-electric pump.

8. The suspension system of claim 1 wherein the valve is a valve which allows fluid to flow from the fluid reservoir toward the strut, but not in the opposite direction.

9. The suspension system of claim 1 wherein the valve is a check valve.

10. The suspension system of claim 1 wherein the fluid reservoir is a low pressure reservoir.

11. The suspension system of claim 1 wherein the pump responds directly to commands from a leveling control.

12. The suspension system of claim 11 wherein the leveling control is a computer.

13. The suspension system of claim 1 further comprising a means to selectively allow fluid to drain from the strut to the fluid reservoir.

14. The suspension system of claim 1 further comprising a dump valve to selectively allow fluid to drain from the strut to the fluid reservoir.

15. In a suspension system having at least two struts, a leveling system comprising:
    a first fluid reservoir, the first fluid reservoir being connected to a first strut by a first fluid passage;
    a first pump, the first pump being controllable between an activated state to increase the pressure of a first quantity of fluid in the first fluid passage and a nonactivated state; and
    a first valve coupled to the first fluid passage, the first valve placing the first fluid reservoir in communication with the first strut to vary the first quantity of fluid in the first strut and control fluid flow of the first quantity of fluid from the first fluid reservoir toward the first strut in response to the first pump being controlled to be in the activated state and the first valve preventing the first fluid reservoir from communicating with the first strut in response to the first pump being controlled to be in the nonactivated state; and
    a second fluid reservoir, the second fluid reservoir being connected to a second strut by a second fluid passage;
    a second pump, the second pump being controllable between an activated state to increase the pressure of a second quantity of fluid in the second fluid passage and a nonactivated state; and
    a second valve coupled to the second fluid passage, the second valve placing the second fluid reservoir in communication with the second strut to vary the second quantity of fluid in the second strut and control fluid flow of the second quantity of fluid from the second fluid reservoir toward the second strut in response to the second pump being controlled to be in the activated state and the second valve preventing the second fluid reservoir from communicating with the second strut in response to the second pump being controlled to be in the nonactivated state;
    wherein the leveling system operates normally without a need for pressure regulation.

16. The suspension system of claim 15 wherein the first and second pumps are each powered by a motor.

17. The suspension system of claim 15 wherein the first and second pumps are hydraulic pumps.

18. The suspension system of claim 17 wherein the first and second pumps are positive displacement pumps.

19. The suspension system of claim 16 wherein the motor is an electric motor.

20. The suspension system of claim 15 wherein the first pump and first valve and the second pump and second valve, each comprise a membrane-type pump.

21. The suspension system of claim 15 wherein the first pump and first valve, and the second pump and second valve, each comprise a piezo-electric pump.

22. The suspension system of claim 15 wherein the first and second valves are valves which allow fluid to flow from the first and second fluid reservoirs toward the strut, but not in the opposite direction.

23. The suspension system of claim 15 wherein the first and second valves are check valves.

24. The suspension system of claim 15 wherein the first and second fluid reservoirs are low pressure reservoirs.

25. The suspension system of claim 15 wherein the first and second pumps respond directly to commands from a leveling control.

26. The suspension system of claim 25 wherein the leveling control is a computer.

27. The suspension system of claim 15 further comprising a means to selectively allow fluid to drain from the first and second struts to the first and second fluid reservoirs, respectively.

28. The suspension system of claim 15 further comprising a first and second dump valve to selectively allow fluid to drain from the first and second struts to the first and second fluid reservoirs, respectively.

29. In a suspension system, a leveling system comprising;
at least one strut;
a fluid reservoir, the fluid reservoir being connected to the at least one strut by a fluid passage;
a pump, the pump being controllable between an activated state to increase the pressure of fluid in the fluid passage to be greater than the fluid pressure in the at least one strut, and a nonactivated state; and
a valve, the valve being able to open to allow fluid to pass from the fluid passage into the at least one strut in response to the pump being controlled to be in the activated state and the valve being able to close to prevent fluid to pass from the fluid passage into the at least one strut in response to the pump being controlled to be in the nonactivated state;
wherein the leveling system operates normally without a need for pressure regulation.

30. The suspension system of claim 29 wherein the pump is a hydraulic pump.

31. The suspension system of claim 30 wherein the pump is a positive displacement pump.

32. The suspension system of claim 29 also including a motor to power the pump, wherein the motor is an electric motor.

33. The suspension system of claim 29 also including a motor to power the pump, wherein the motor is a piezo-electric motor.

34. The suspension system of claim 29 wherein the fluid reservoir is a low pressure reservoir.

35. The suspension system of claim 29 also including a motor to power the pump, wherein the motor and pump respond directly to commands from a leveling control.

36. The suspension system of claim 35 wherein the leveling control is a computer.

37. The suspension system of claim 29 further comprising a means to selectively allow fluid to drain from the at least one strut to the fluid reservoir.

38. The suspension system of claim 29 further comprising a dump valve to selectively allow fluid to drain from the at least one strut to the fluid reservoir.

39. In a suspension system having at least one strut, a leveling system comprising:
a fluid reservoir, the fluid reservoir being connected to the strut by a fluid passage;
a pump, the pump being controllable between an activated state to increase the pressure of fluid in the fluid passage and a nonactivated state; and
a check valve coupled to the fluid passage, the check valve placing the fluid reservoir in communication with the strut to vary fluid quantity in the strut and control fluid flow from the fluid reservoir toward the strut in response to the pump being controlled to be in the activated state and the check valve preventing the fluid reservoir from communicating with the strut in response to the pump being controlled to be in the nonactivated state;
wherein the leveling system operates normally without a need for pressure regulation.

40. The suspension system of claim 39 wherein the pump is powered by a motor.

41. The suspension system of claim 39 wherein the pump is a hydraulic pump.

42. The suspension system of claim 41 wherein the pump is a positive displacement pump.

43. The suspension system of claim 40 wherein the motor is an electric motor.

44. The suspension system of claim 39 wherein the pump and the check valve comprise a membrane-type pump.

45. The suspension system of claim 39 wherein the pump and the check valve comprise a piezo-electric pump.

46. The suspension system of claim 39 wherein the fluid reservoir is a low pressure reservoir.

47. The suspension system of claim 39 wherein the pump responds directly to commands from a leveling control.

48. The suspension system of claim 47 wherein the leveling control is a computer.

49. The suspension system of claim 39 further comprising a means to selectively allow fluid to drain from the strut to the fluid reservoir.

50. The suspension system of claim 39 further comprising a dump valve to selectively allow fluid to drain from the strut to the fluid reservoir.

51. In a suspension system having at least two struts, a leveling system separately comprising for each strut:
a fluid reservoir the fluid reservoir being connected to the strut by a fluid passage;
a pump, the pump being controllable between an activated state to increase the pressure of fluid in the fluid passage and a nonactivated state;
a means for introducing fluid from the reservoir into the strut, the means for introducing fluid placing the fluid reservoir in communication with the strut to vary fluid quantity in the strut and control fluid flow from the fluid reservoir toward the strut in response to the pump being controlled to be in the activated state and the means for introducing fluid preventing the fluid reservoir from communicating with the strut in response to the pump being controlled to be in the nonactivated state; and
a means for selectively removing fluid from the strut;
wherein the leveling system operates normally without a need for pressure regulation.

52. The suspension system of claim 51 where in the pump is powered by a motor.

53. The suspension system of claim 51 wherein the pump is a hydraulic pump.

54. The suspension system of claim 53 wherein the pump is a positive displacement pump.

55. The suspension system of claim 52 wherein the motor is an electric motor.

56. The suspension system of claim 51 wherein the pump and means for introducing fluid comprise a membrane-type pump.

57. The suspension system of claim 51 wherein the pump and means for introducing fluid comprise a piezo-electric pump.

58. The suspension system of claim 51 wherein the fluid reservoir is a low pressure reservoir.

59. The suspension system of claim 51 wherein the pump responds directly to commands from a leveling control.

60. The suspension system of claim 59 wherein the leveling control is a computer.

61. In a suspension system having at least two struts, a leveling system separately comprising for each strut:
- a fluid reservoir, the fluid reservoir being connected to the strut by a fluid passage;
- a pump, the pump being controllable between an activated state to increase the pressure of fluid in the fluid passage and a nonactivated state;
- a sensor operable to generate a signal representative of a height of the strut; and
- a valve coupled to the fluid passage, the valve placing the fluid reservoir in communication with the strut to vary fluid quantity in the strut and control fluid flow from the fluid reservoir toward the strut in response to the pump being controlled to be in the activated state and the valve preventing the fluid reservoir from communicating with the strut in response to the pump being controlled to be in the nonactivated state;
- wherein the pump is controlled between the activated state and the nonactivated state in response to signals from the sensor to set a ride height for the suspension system.

* * * * *